H. K. PORTER.
METAL CUTTING TOOL.
APPLICATION FILED JAN. 9, 1915.
1,146,951.
Patented July 20, 1915.
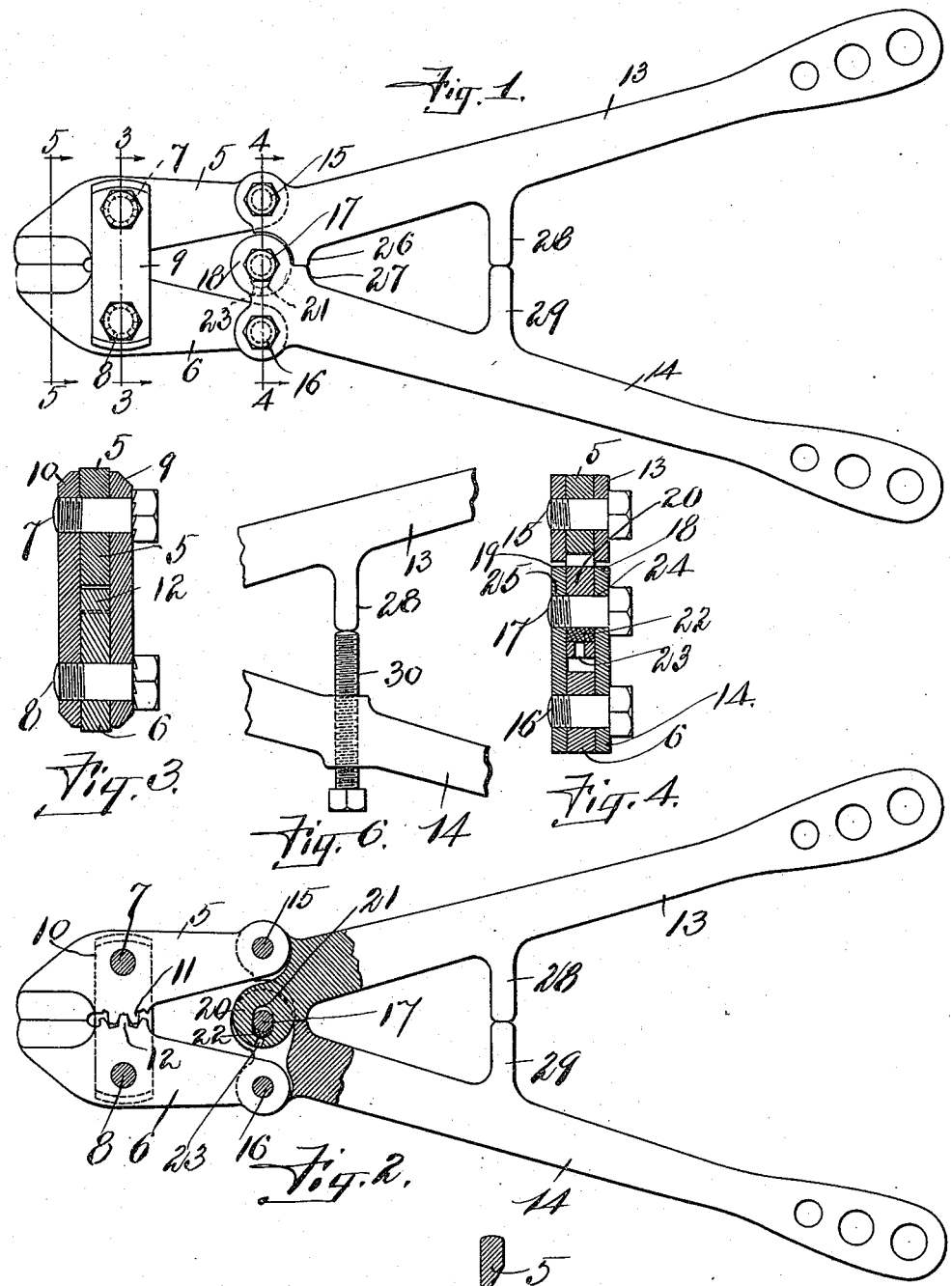

UNITED STATES PATENT OFFICE.

HENRY K. PORTER, OF BOSTON, MASSACHUSETTS.

METAL-CUTTING TOOL.

1,146,951.      Specification of Letters Patent.      Patented July 20, 1915.

Application filed January 9, 1915. Serial No. 1,428.

*To all whom it may concern:*

Be it known that I, HENRY K. PORTER, a citizen of the United States, residing at Boston, in the county of Suffolk and State of Massachusetts, have invented new and useful Improvements in Metal-Cutting Tools, of which the following is a specification.

This invention relates to a tool for cutting metal and is especially adapted for cutting rods and bolts.

The object of the invention is to provide a powerful hand tool for the purpose specified and one in which the cutting edges of the tool may be quickly and accurately adjusted relatively to each other so as to bring said cutting edges accurately together and make up for any material lost by wear, breakage or by grinding said cutting edges.

The invention consists in the combination and arrangement of parts set forth in the following specification and particularly pointed out in the claim.

Referring to the drawings: Figure 1 is a plan view of my improved cutting tool. Fig. 2 is a plan view of the same partly broken away and shown in section, with the parts adjusted to place them in slightly different positions relatively to each other and to bring the cutting edges together. Fig. 3 is an enlarged sectional elevation taken on line 3—3 of Fig. 1. Fig. 4 is an enlarged sectional elevation taken on line 4—4 of Fig. 1. Fig. 5 is a detail section taken on line 5—5 of Fig. 1. Fig. 6 is a detail view of a modified form showing the handles broken away.

Like numerals refer to like parts throughout the several views of the drawings.

In the drawings, 5 and 6 are cutter levers which are pivotally connected to each other by pivotal screws 7 and 8, respectively, said screws projecting through a strap plate 9 and having screw-threaded engagement with another strap plate 10. Said cutter levers are further connected together by teeth 11 on the cutter lever 5 meshing into teeth 12 provided on the cutter lever 6. A pair of handles 13 and 14 are pivotally connected to the cutter levers 5 and 6 by pivotal screws 15 and 16, respectively. A pivot 17 connects the handles 13 and 14 together. The handle 14 is bifurcated to form two ears 18 and 19 and between these ears an ear 20 on the handle 13 projects. The ear 20 is provided with a slot 21 which, when the tool is new, is filled with malleable material 22, such as lead. A port 23 leads out of one end of the slot 21. The pivot 17 is preferably made in the form of a screw which extends through holes 24 and 25 in the ears 18 and 19, respectively, and has screw-threaded engagement with the ear 19. Said pivotal screw 17 extends through the slot 21 and engages the malleable material or lead 22 therein. A pair of oppositely disposed supplementary stops 26 and 27 are provided on the handles 13 and 14, respectively. These stops are integral with said handles 13 and 14 and are arranged to abut against each other when the cutting edges of the cutter levers 5 and 6 contact with each other. Another pair of oppositely disposed stops 28 and 29 integral with the handles 13 and 14, respectively, are located intermediate the pivot 17 and the free ends of the handles 13 and 14, while the stops 26 and 27 before referred to are in close proximity to the pivot 17 and located between said pivot 17 and the stops 28 and 29.

When the tool is new the parts are arranged so that the cutting edges of the cutter levers 5 and 6 contact with each other, the stops 26 and 27 abut against each other and the stops 28 and 29 abut against each other.

In Fig. 6 a modified form of my invention is illustrated in which the handle 13 has the stop 28 integral therewith, while the handle 14 has an adjustable stop 30 which has screw-threaded engagement with said handle 14.

The general operation of the device is as follows: In Fig. 1 the tool is shown with the cutting edges of the cutter levers 5 and 6 meeting and with the stops 28 and 29 abutting while the stops 26 and 27 also abut. To open the cutter levers 5 and 6 the handles 13 and 14 are moved apart and vice versa. Assuming that the malleable material 22 fills the slot 21 when the tool is new, then the parts would be in the relative positions illustrated in Fig. 1 when the cutting edges of the cutter levers 5 and 6 meet and at this time the pivotal screw 17 would be at the upper end of the slot 21, as illustrated in dotted lines (Fig. 1). After the cutting edges of the cutter levers 5 and 6 have worn away or been sharpened so as to wear them away and it is desired to bring said cutting edges together, then the stops 28 and 29, either or both, are filed away slightly. Then when the handles are closed until the stops 28 and 29 meet the cutting edges of the levers 5 and 6 will not meet until said handles 13 and 14 are forced toward each other, whereupon the pivot 17 will be forced downwardly in the slot 21 by reason of the supplementary stop 26 encountering the supplementary stop 27 on the handle 14, and when the handles 13 and 14 under these conditions are forced together until the stops 28 and 29 meet, then a portion of the lead 22 in said slot 21 will be forced into and through the port 23. This will change the position of the pivot 17 in the slot 21, thus causing the pivots 15 and 16 to be forced apart by reason of the supplementary stop 26 abutting against the supplementary stop 27 and forming a pivot about which the handles 13 and 14 rotate until the screw 17 moves downwardly in the slot 21 (see Fig. 2), and hence as the pivots 15 and 16 are thus moved apart the cutter levers 5 and 6 will be moved apart on that side of their pivots adjacent to the pivots 15 and 16 and will be moved toward each other on that side of their pivots upon which are located the cutting edges of said cutter levers. The stops 28 and 29 are filed sufficiently so that when the cutting edges of the cutter levers 5 and 6 meet the supplementary stop 26 will encounter the supplementary stop 27 on the handle 14 and the stop 28 will encounter the stop 29 on said handle 14. The tool is then in condition to be used to the best advantage in its changed condition for cutting metal.

In Fig. 6 a modified form of my invention is illustrated in which the stop 28 is integral with the handle 13 but the stop 30 on the handle 14 is made in the form of an adjustable screw, in which case the stops 26 and 27 would still remain as integral parts of the handles 13 and 14, respectively, but the stop 30 will be adjusted by rotating said screw 30 the proper amount and the stop 28 will not be changed, so that when the cutter is in proper adjusted relation the cutting edges of the levers 5 and 6 will contact with each other, the stops 26 and 27 will abut and the stop 28 will abut against the end of the screw 30.

Having thus described my invention, what I claim and desire by Letters Patent to secure is:

A metal cutting tool having, in combination, a pair of cutter levers pivotally connected to each other, a pair of handles, a pair of pivots connecting said cutter levers to said handles, a pivot connecting said handles together and located between said pair of pivots, said last-named pivot being fastened to one of said handles and projecting through a slot in the other of said handles, said slot being filled with ductile material and having a port leading out of the same through which a portion of said ductile material may be forced, a pair of oppositely disposed stops integral with said handles intermediate of said last-named pivot and the free ends of said handles and a pair of oppositely disposed supplementary stops integral with said handles in close proximity to said last-named pivot, said pairs of stops arranged to abut against each other when the cutting edges of said levers contact.

In testimony whereof I have hereunto set my hand in presence of two subscribing witnesses.

HENRY K. PORTER.

Witnesses:
CHARLES S. GOODING,
SYDNEY E. TAFT.

Copies of this patent may be obtained for five cents each, by addressing the "Commissioner of Patents, Washington, D. C."